(12) United States Patent
Soga et al.

(10) Patent No.: US 8,233,245 B2
(45) Date of Patent: Jul. 31, 2012

(54) PIEZOELECTRIC ELEMENT WITH ELECTRODE AND HEAD SUSPENSION

(75) Inventors: Jun Soga, Aikoh-gun (JP); Masao Hanya, Aikoh-gun (JP); Toshiki Ando, Aikoh-gun (JP); Hideki Kashima, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 85 days.

(21) Appl. No.: 12/784,198

(22) Filed: May 20, 2010

(65) Prior Publication Data

US 2010/0302687 A1 Dec. 2, 2010

(30) Foreign Application Priority Data

May 29, 2009 (JP) ................................ P2009-130177

(51) Int. Cl.
*G11B 5/56* (2006.01)
(52) U.S. Cl. .................................................. 360/294.4
(58) Field of Classification Search ................ 360/294.4
See application file for complete search history.

(56) References Cited

U.S. PATENT DOCUMENTS

| | | | | |
|---|---|---|---|---|
| 6,327,120 | B1 * | 12/2001 | Koganezawa et al. | 360/294.4 |
| 2002/0064001 | A1 * | 5/2002 | Shiraishi et al. | 360/294.4 |
| 2002/0075606 | A1 * | 6/2002 | Nishida et al. | 360/294.4 |
| 2002/0089793 | A1 * | 7/2002 | Nakagawa et al. | 360/294.4 |
| 2003/0123196 | A1 * | 7/2003 | Shiraishi et al. | 360/294.4 |

FOREIGN PATENT DOCUMENTS

| | | | |
|---|---|---|---|
| JP | 2001339967 A | * | 12/2001 |
| JP | 2002-184139 | | 6/2002 |
| JP | 2002-184140 | | 6/2002 |

* cited by examiner

*Primary Examiner* — David D Davis
(74) *Attorney, Agent, or Firm* — Jordan and Hamburg LLP

(57) ABSTRACT

A piezoelectric element with electrode is capable of preventing an assembling error. The piezoelectric element includes a piezoelectric body configured to deform according to polarity in response to a voltage applied thereto, electrodes formed on surfaces of the piezoelectric body, respectively, a non-electrode part formed on at least one of the surfaces of the piezoelectric body, the non-electrode part continuing to the one electrode that is on the at least one surface of the piezoelectric body, and a boundary between the non-electrode part and the one electrode. The boundary has a pattern to indicate the polarity of the piezoelectric element.

18 Claims, 15 Drawing Sheets

Fig.9

|  | Polarization voltage | Microcracks at straight line | Microcracks at recognition mark |
|---|---|---|---|
| 1st embodiment | Normal voltage (Nv) | OK | NG |
| 2nd embodiment | 1.4 x Nv | OK | OK |
| 3rd embodiment | 1.4 x Nv | OK | OK |
| 4th embodiment | 1.4 x Nv | OK | OK |
| 5th embodiment | 1.4 x Nv | OK | OK |
| 5th embodiment (modification) | 1.4 x Nv | OK | OK |

PIEZOELECTRIC ELEMENT WITH ELECTRODE AND HEAD SUSPENSION

BACKGROUND OF THE INVENTION

1. Field of the Invention

The present invention relates to a piezoelectric element with electrodes that is provided with electrodes and deforms according to a voltage applied thereto and to a head suspension employing the piezoelectric element.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

For the magnetic disk drives, an urgent task is to increase storage capacities. Increasing the storage capacity of a magnetic disk drive is generally achieved by increasing the storage capacity of a magnetic disk contained in the magnetic disk drive. The storage capacity or recording density of a magnetic disk will increase, without changing the diameter thereof, if the number of tracks per inch (TPI) on the magnetic disk increases, i.e., if the width of a track narrows. For this, a magnetic head of a head suspension installed in the magnetic disk drive must conduct precise positioning in a direction across the tracks, i.e., a sway direction. For realizing the precise positioning, an actuator capable of accurately moving and positioning the magnetic head in a very small range is needed.

To meet the need, the applicant of the present invention has proposed in Japanese Unexamined Patent Application Publication No. 2002-184140 a head suspension for a disk drive. The head suspension includes a base plate, a connection plate having a hinge thinner than the base plate, a load beam provided with a flexure, and a piezoelectric actuator having a pair of piezoelectric elements.

This related art employs a dual actuator system that involves, for precise positioning, a voice coil motor and the piezoelectric actuator having two piezoelectric elements made of, for example, PZT (lead zirconate titanate).

The piezoelectric actuator in the dual actuator system minutely moves a front end of the load beam in a lateral direction (sway direction) of the head suspension. Compared with a single actuator system employing only the voice coil motor, the dual actuator system is capable of more precisely positioning a magnetic head attached to a front end of the head suspension.

An important issue for the head suspension employing the dual actuator system is to protect the brittle piezoelectric elements from damage, prevent particles from dropping off the surfaces of the piezoelectric elements, and secure electric insulation between the head suspension body and the piezoelectric elements.

One approach to address the issue is disclosed in Japanese Unexamined Patent Application Publication No. 2002-184139 a head suspension for a disk drive. The head suspension includes an actuator base, an opening formed in the actuator base, and a piezoelectric element attached to the opening with a nonconductive adhesive. The nonconductive adhesive covers a circumferential end face of the piezoelectric element.

The head suspension of this related art is capable of protecting the piezoelectric element from damage, preventing particles from dropping off the surface of the piezoelectric element, and securing insulation between the piezoelectric element and the actuator base.

When attaching a piezoelectric element to an object such as a head suspension, it is very important to correctly orient the piezoelectric element. Generally, the piezoelectric element has polarity. If the piezoelectric element is reversely oriented and attached to the head suspension, the head suspension will deform opposite to an intended direction. This will cause serious troubles, and therefore, must be avoided.

Conventional piezoelectric elements, however, have no external appearances to indicate polarity. Accordingly, a misoriented piezoelectric element in a head suspension is frequently overlooked at the time of assembling until it is finally found in a finished-product test.

SUMMARY OF THE INVENTION

An object of the present invention is to provide a piezoelectric element capable of preventing an assembling mistake and a head suspension employing the piezoelectric element.

In order to accomplish the object, an aspect of the present invention provides a piezoelectric element having a piezoelectric body that deforms according to polarity in response to a voltage applied thereto, electrodes formed on surfaces of the piezoelectric body, respectively, a non-electrode part formed on at least one of the surfaces of the piezoelectric body, the non-electrode part continuing to the one electrode that is on the at least one surface of the piezoelectric body, and a boundary between the non-electrode part and the one electrode, the boundary having a pattern to indicate at least the polarity of the piezoelectric element.

According to this aspect of the present invention, the pattern of the boundary between the non-electrode part and the one electrode indicates the polarity of the piezoelectric element, so that the polarity is externally recognizable when the piezoelectric element is attached to an object, e.g., a head suspension. Even if the piezoelectric element is wrongly placed, it can be corrected before assembling. In this way, this aspect of the present invention prevents an erroneous attachment of the piezoelectric element.

BRIEF DESCRIPTION OF THE DRAWINGS

FIGS. 1A and 1B illustrate a piezoelectric element according to a first embodiment of the present invention, in which FIG. 1A is a perspective view and FIG. 1B is a sectional view taken along a line A-A of FIG. 1A;

FIGS. 2A and 2B illustrate the piezoelectric element of the first embodiment, in which FIG. 2A is a plan view and FIG. 2B is an essential part of FIG. 2A;

FIGS. 4A to 4C are microphotographs of a piezoelectric element having microcracks, in which FIG. 4A is at an enlargement ratio of 200, FIG. 4B at an enlargement ratio of 1000, and FIG. 4C at an enlargement ratio of 5000;

FIGS. 5A and 5B illustrate a piezoelectric element according to a second embodiment of the present invention, in which FIG. 5A is a plan view and FIG. 5B is an essential part of FIG. 5A;

FIGS. 6A and 6B illustrate a piezoelectric element according to a third embodiment of the present invention, in which FIG. 6A is a plan view and FIG. 6B is an essential part of FIG. 6A;

FIGS. 7A and 7B illustrate a piezoelectric element according to a fourth embodiment of the present invention, in which FIG. 7A is a plan view and FIG. 7B is an essential part of FIG. 7A;

FIGS. 8A and 8B illustrate a piezoelectric element according to a fifth embodiment of the present invention, in which FIG. 8A is a plan view and FIG. 8B is a modification of the fifth embodiment;

FIG. 9 is a table illustrating crack observation results on the piezoelectric elements of the first to fifth embodiments of the present invention;

DETAILED DESCRIPTION OF EMBODIMENTS

The embodiments of the present invention will be explained in detail with reference to the drawings.

Figure 1A:
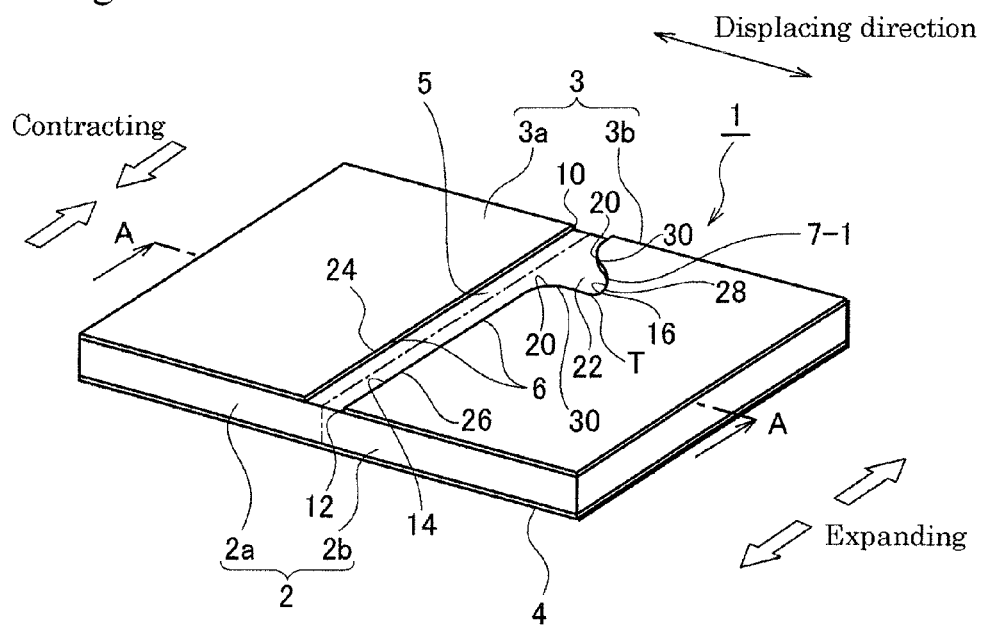
Figure 1B:
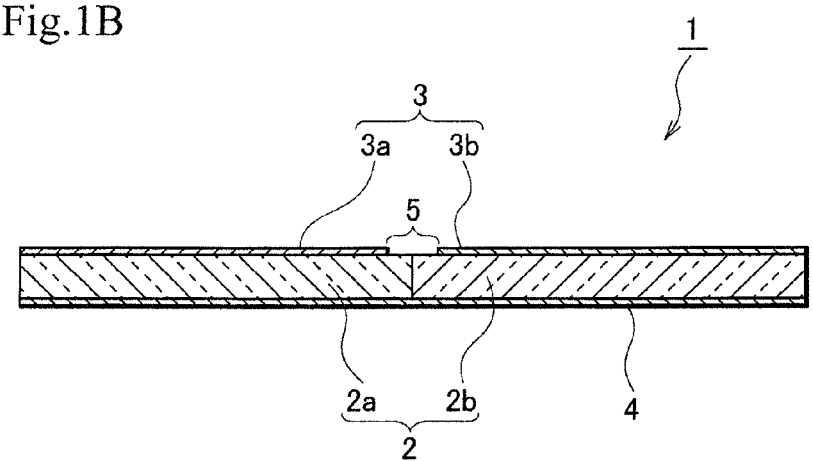
Figure 2A:
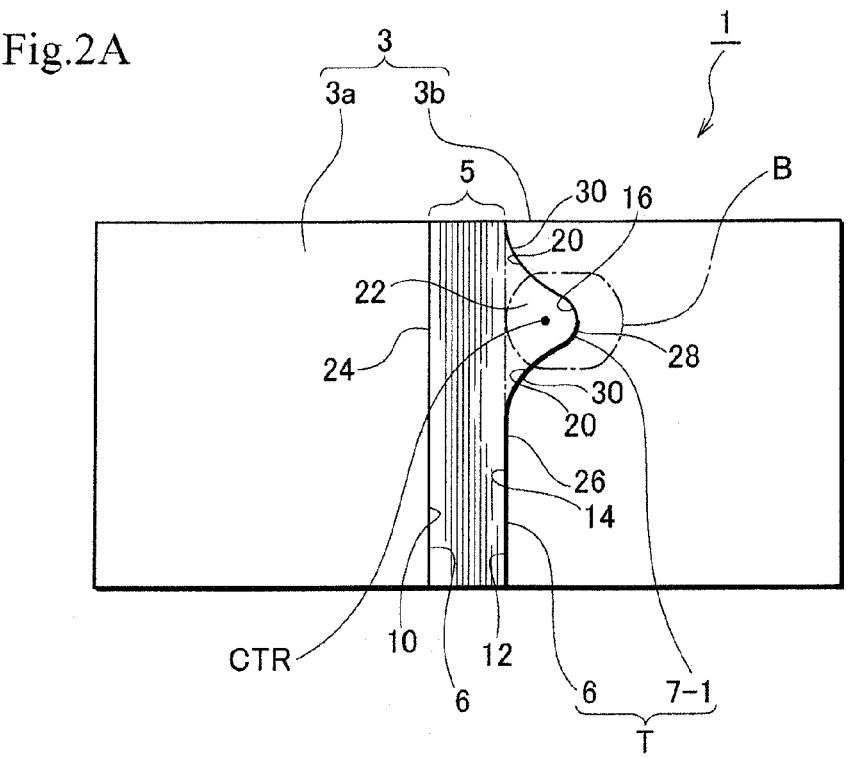
Figure 2B:
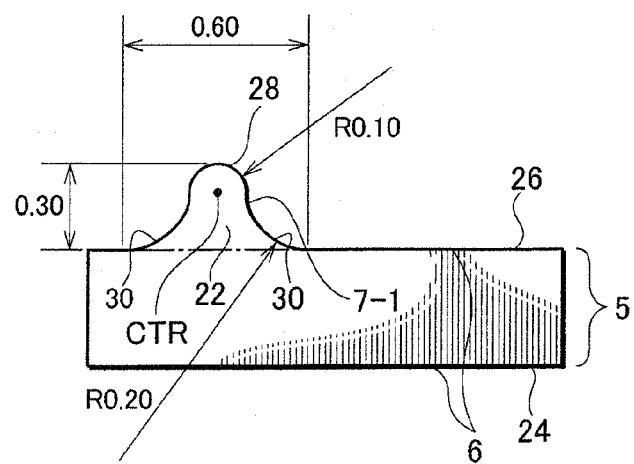

FIGS. 1A to 2B illustrate a piezoelectric element according to the first embodiment of the present invention, in which FIG. 1A is a perspective view, FIG. 1B is a sectional view taken along a line A-A of FIG. 1A, FIG. 2A is a plan view, and FIG. 2B is an essential part of FIG. 2A.

As shown in FIGS. 1 to 2B, the piezoelectric element 1 according to the first embodiment has a piezoelectric body 2, electrodes 3 and 4, and a non-electrode part 5.

The piezoelectric body 2 deforms according to polarity in response to a voltage applied thereto. The piezoelectric body 2 is made of piezoelectric ceramics such as PZT (lead zirconate titanate), is rectangular whose dimension in a longitudinal direction is longer than a dimension in a lateral direction (left-right). The piezoelectric body 2 has a thickness in the range of, for example, about 70 to 200 μm. The piezoelectric body 2 includes a pair of piezoelectric layers $2a$ and $2b$ arranged side by side in the lateral direction.

The piezoelectric layers $2a$ and $2b$ are left-right symmetrical and are oppositely polarized at an angle of 180 degrees. This configuration, however, does not limit the present invention. The piezoelectric layers $2a$ and $2b$ may be polarized in the same direction.

The electrodes 3 and 4 are made of good conductive material having low contact resistance, such as gold (Au). The electrodes 3 and 4 are formed on opposite surfaces in a thickness direction of the piezoelectric body 2, respectively, by proper means such as vapor deposition, spattering, plating, and metal paste (silver, silver-palladium, platinum, and the like).

The upper electrode 3 includes electrode segments $3a$ and $3b$ each being rectangular. The electrode segments $3a$ and $3b$ are formed on the piezoelectric layers $2a$ and $2b$, respectively. The electrode segments $3a$ and $3b$ are separated from each other by the non-electrode part 5 on the same surface of the piezoelectric body 2.

The electrode segment $3a$ has an edge 10 along the non-electrode part 5, the edge 10 linearly extending along the longitudinal direction of the piezoelectric body 2.

The electrode segment $3b$ has an edge 12 along the non-electrode part 5, the edge 12 including a main section 14 and a recess 16. The main section 14 linearly extends along the longitudinal direction of the piezoelectric body 2 and the recess 16 curves from the non-electrode part 5 into the electrode segment $3b$. The recess 16 is a circular arc having a predetermined curvature and includes curves 20 that are continuous to the main section 14 of the edge 12. Each curve 20 has a larger curvature radius than the recess 16.

The lower electrode 4 is not provided with the non-electrode part 5. According to the first embodiment, the lower electrode 4 is a common electrode for the electrode segments $3a$ and $3b$ of the upper electrode 3, the upper electrode 3 opposing the lower electrode 4 with the piezoelectric body 2 interposed between them. Like the upper electrode 3, the lower electrode 4 may also be made of symmetrical electrode segments. When receiving an external input voltage, the piezoelectric layers $2a$ and $2b$ of the piezoelectric body 2 between the electrodes 3 and 4 individually deform.

The non-electrode part 5 is formed between the edges 10 and 12 of the electrode segments $3a$ and $3b$ and is located at an intermediate part of the upper electrode 3. Namely, the non-electrode part 5 adjoins the electrode segments $3a$ and $3b$ and continues to the upper electrode 3. The non-electrode part 5 is a rectangular channel along the longitudinal direction of the piezoelectric body 2 and includes a swell 22 corresponding to the recess 16 of the electrode segment $3b$.

Between the non-electrode part 5 and the electrode segments $3a$ and $3b$ of the upper electrode 3, there are boundaries 24 and 26. The boundaries 24 and 26 correspond to the edges 10 and 12 of the electrode segments $3a$ and $3b$.

The boundary 24 is defined with a straight line 6 corresponding to the edge 10 of the electrode segment $3a$.

The other boundary 26 is characterized by a pattern T that represents the polarity of the piezoelectric element 1 and functions to make the polarity easily recognizable from the outside. The pattern T of the boundary 26 includes a straight line 6 and a polarity recognition mark 7-1. The straight line 6 corresponds to the main section 14 of the edge 12 of the electrode segment $3b$. The polarity recognition mark 7-1 has a notch 28 and skirts 30 corresponding to the recess 16 and curves 20 of the edge 12.

Namely, the mark 7-1 is a continuation of the notch 28 and skirts 30 and is smooth to avoid a local stress concentration onto the piezoelectric body 2.

The straight lines 6 of the edges 10 and 12 are also smooth to avoid a local stress concentration on the piezoelectric body 2. Namely, the edges 10 and 12 of the piezoelectric segments $3a$ and $3b$ are entirely smooth including the curves and straight lines.

As illustrated in FIGS. 2A and 2B, the mark 7-1 has a depth (a dimension in the lateral direction of the piezoelectric body 2) of about 0.30 mm, a width (a dimension in the longitudinal direction of the piezoelectric body 2) of about 0.60 mm, a curvature radius at the notch 28 of about 0.10 mm, a curvature radius of the skirt 30 of about 0.20 mm that is about twice as large as the curvature radius of the notch 28.

The notch 28 of the mark 7-1 has a curvature center CTR that is shifted from the straight line 6 into the electrode segment $3b$. Namely, the mark 7-1 swells from the straight line 6 into the electrode segment $3b$. It is possible to swell the mark 7-1 into the non-electrode part 5.

In this way, the mark 7-1 employs one or a combination of the position, quantity, curvature radius, and swelling direction thereof, to characterize the pattern T that provides information regarding the piezoelectric element 1 including at least polarity thereof.

Figure 3:
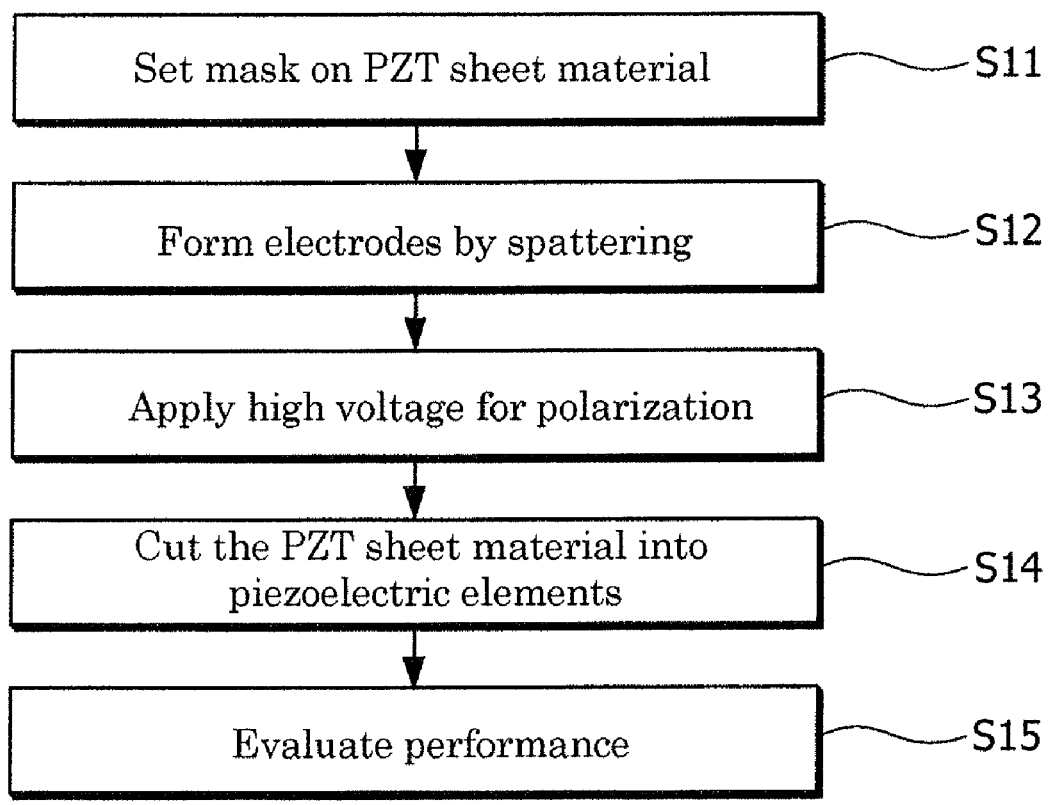
FIG. 3 is a flowchart illustrating manufacturing of the piezoelectric element of the first embodiment.

Manufacturing the piezoelectric element 1 according to the first embodiment will be explained with reference to FIG. 3 that is a flowchart illustrating manufacturing of the piezoelectric element 1.

Step S11 prepares a PZT sheet material (not illustrated), and on the sheet material, sets a mask having a plurality of the patterns T. If the sheet material is planned to produce 16 piezoelectric elements, the mask has 16 patterns T.

Step S12 forms gold (Au) electrodes on the sheet material by, for example, spattering.

Step S13 applies a voltage to the sheet material provided with the electrodes, to polarize the same. The voltage may be a high DC voltage of about 1 kV/mm, which is usually adopted for PZT-based piezoelectric ceramics. This step forms the left-right symmetrical piezoelectric layers 2*a* and 2*b* that are oppositely polarized at an angle of 180 degrees.

Step S14 cuts the sheet material with the electrodes into individual piezoelectric elements 1.

Step S15 carries out a performance evaluation test on the piezoelectric elements 1. Only those of the piezoelectric elements that pass the test are supplied as products.

As mentioned above, the piezoelectric element 1 according to the first embodiment includes the piezoelectric body 2 that deforms according to polarity in response to a voltage applied thereto, the electrodes 3 and 4 formed on the upper and lower surfaces of the piezoelectric body 2, respectively, the non-electrode part 5 formed on at least one of the upper and lower surfaces of the piezoelectric body 2, and the boundary 26 formed between the non-electrode part 5 and the electrode 3, the boundary 26 having the pattern T to indicate the polarity of the piezoelectric element.

Before attaching the piezoelectric element 1 to an object such as a head suspension, the embodiment enables the polarity of the piezoelectric element 1 to be recognized from the appearance thereof. Accordingly, even if the piezoelectric element 1 is wrongly placed, it can be corrected before fixing the piezoelectric element 1 to the object. The embodiment, therefore, prevents an erroneous attachment of the piezoelectric element 1.

According to the embodiment, the pattern T of the boundary 26 between the electrode 3 and the non-electrode part 5 forms the polarity recognition mark 7-1. This technique is easy and inexpensive to indicate the polarity of the piezoelectric element 1 and causes no interference with a cleaning process of the object (head suspension).

In contrast, the polarity recognition mark may be an ink marking printed with ink on the piezoelectric element that causes interference with a cleaning process. When applied to a head suspension of a magnetic disk drive, the piezoelectric element is subjected to a cleaning process together with the head suspension. In this case, the ink marking is improper.

The polarity recognition mark may be a punch marking made by punching the electrode surface of the piezoelectric element with a punch. The piezoelectric element has a thickness of about 0.1 mm and the electrode formed thereon is very thin in a submicron range. Accordingly, it is very difficult to adjust force applied to the punch when punching the electrode surface of the piezoelectric element. Namely, the punch marking is impractical as the polarity recognition mark.

The polarity recognition mark may be a laser marking. The laser marking needs an expensive system and a separate process, and therefore, is inferior to the embodiment.

In this way, none of these ideas provides the effect of the present invention.

According to the embodiment, the boundaries 24 and 26 are smooth to avoid a local stress concentration on the piezoelectric body 2, thereby protecting the piezoelectric body 2 from microcracks. This results in securing the reliability of the piezoelectric element 1 for a long time and improving the productivity thereof.

Figure 4A:
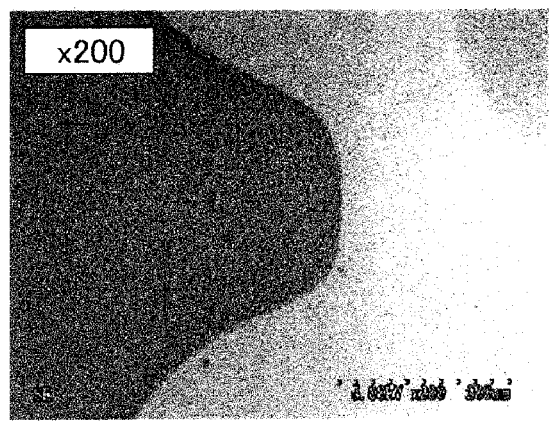
Figure 4B:
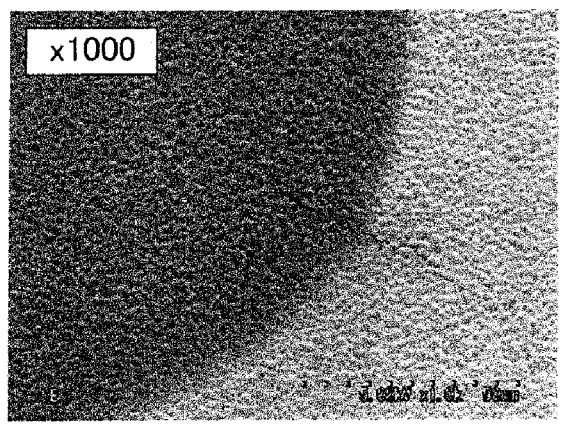
Figure 4C:
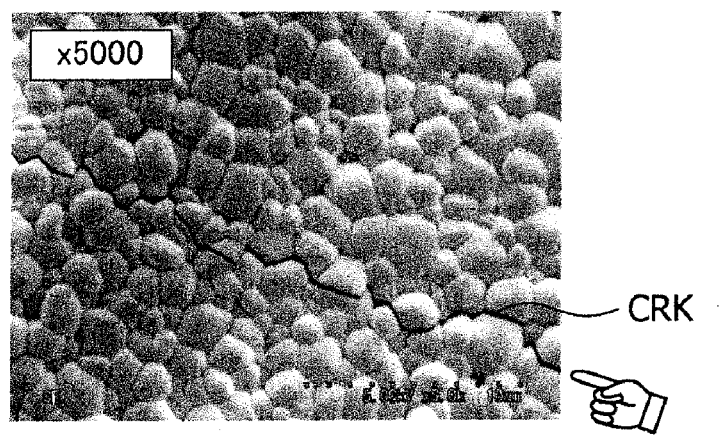

FIGS. 4A to 4C are microphotographs of a piezoelectric element having microcracks, in which FIG. 4A is at an enlargement ratio of 200, FIG. 4B at an enlargement ratio of 1000, and FIG. 4C at an enlargement ratio of 5000.

As illustrated in FIGS. 4A to 4C, a piezoelectric element after a polarization process sometimes has microcracks that are not present before the polarization process. The microcracks are very small, are not observable with a stereoscopic microscope, and are hardly found by measuring electrical characteristics. The object such as a head suspension in which the piezoelectric element is installed is subjected to a performance evaluation test by measuring, for example, electrostatic capacitance. The microcracks, however, produce no change in the electrostatic capacitance.

Any piezoelectric element having the microcracks must be discarded as an unacceptable product because of a possibility of lowering reliability in a long range. To prevent the microcracks, the piezoelectric element must take an effective measure.

On a thin piezoelectric element having a micron-order thickness, the microcracks occur due to a stress concentration along a boundary between an electrode and a non-electrode part. When the piezoelectric element is polarized (S13 of FIG. 3) after forming electrodes (S12 of FIG. 3) on the piezoelectric element, the stress concentration occurs due to expansion and contraction of the piezoelectric element.

More precisely, when a polarization voltage is applied to the electrodes of the piezoelectric element, piezoelectric layers of the piezoelectric element corresponding to the electrodes expand in a thickness direction and contract in a planar direction orthogonal to the thickness direction. At this time, part of the piezoelectric layers corresponding to the non-electrode part causes no expansion or contraction in the thickness and planar directions. As a result, the boundary of the non-electrode part receives complicated shearing force caused by expansion force in the thickness direction and contraction force in the planar direction. The stress concentration along the boundary causes the microcracks.

The first embodiment reduces the probability of microcrack generation. Namely, the embodiment smoothes the pattern T of the boundary 26 and the pattern of the boundary 24, to avoid a local stress concentration on the piezoelectric body 2, thereby effectively suppressing the generation of microcracks.

Figure 5A:
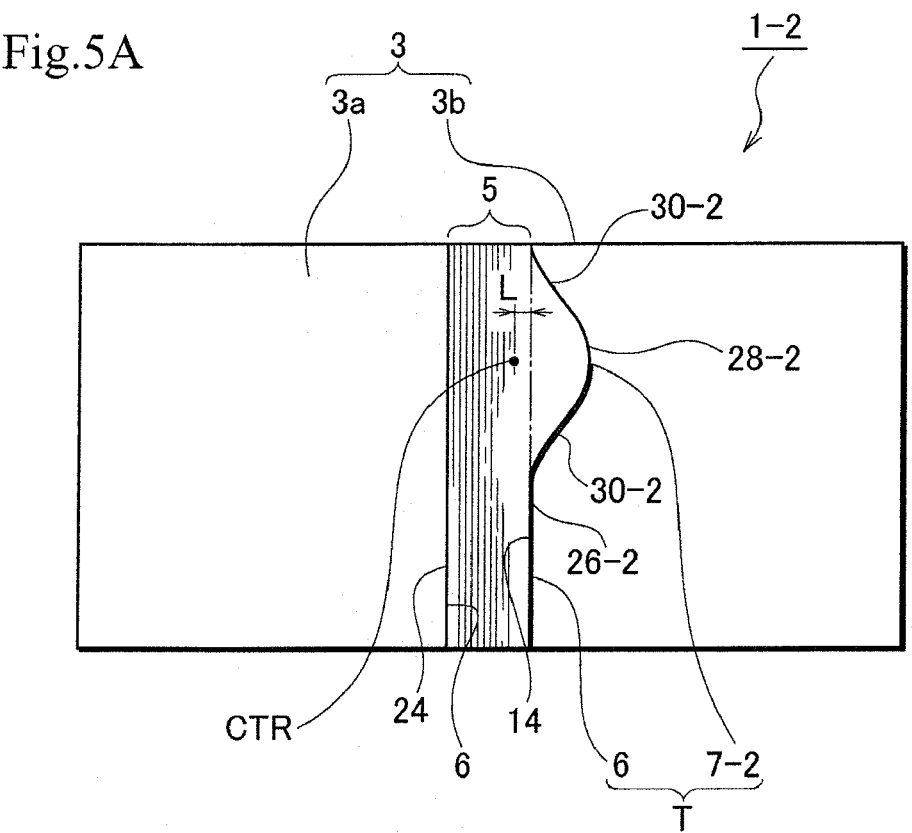
Figure 5B:
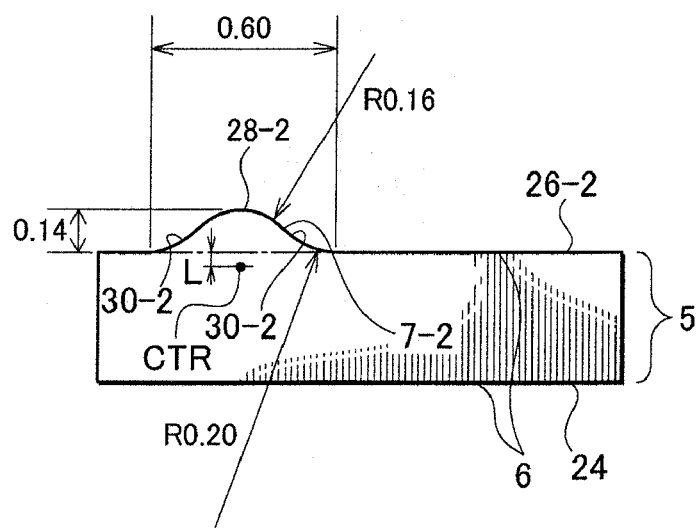

A piezoelectric element according to the second embodiment of the present invention will be explained with reference to FIGS. 5A and 5B in which FIG. 5A is a plan view and FIG. 5B is an essential part of FIG. 5A.

The second embodiment is basically the same as the first embodiment, and therefore, repetition of explanation is omitted and differences between them will mainly be explained.

According to the first embodiment, the curvature center CTR of the notch 28 of the polarity recognition mark 7-1 is shifted from the straight line 6 into the electrode segment 3*b*.

On the other hand, the second embodiment employs a polarity recognition mark 7-2 having a notch 28-2 whose curvature center CTR is shifted from a straight line 6 into a non-electrode part 5.

Namely, the notch 28-2 of the mark 7-2 swells into an electrode segment 3*b* from the straight line 6 and the curvature center CTR of the notch 28-2 is shifted from the straight line 6 into the non-electrode part 5 opposite to the swelling direction.

The mark 7-2 has a depth of about 0.14 mm, a width of about 0.60 mm, a curvature radius of the notch 28-2 of about 0.16 mm, and a curvature radius of a skirt 30-2 of about 0.20 mm.

According to the second embodiment, a boundary 26-2 has a pattern T that is smooth. The notch 28-2 of the mark 7-2 swells into the electrode segment 3b from the straight line 6 and the curvature center CTR of the notch 28-2 is shifted from the straight line 6 into the non-electrode part 5 opposite to the swelling direction.

The second embodiment provides the same effect as the first embodiment, and in addition, surely prevents a stress concentration on a piezoelectric body 2 and an occurrence of microcracks.

The curvature center CTR of the notch 28-2 of the mark 7-2 may be set just on the straight line 6. This provides the same effect as when the curvature center CTR of the notch 28-2 is shifted opposite to the swelling direction.

Figure 6A:
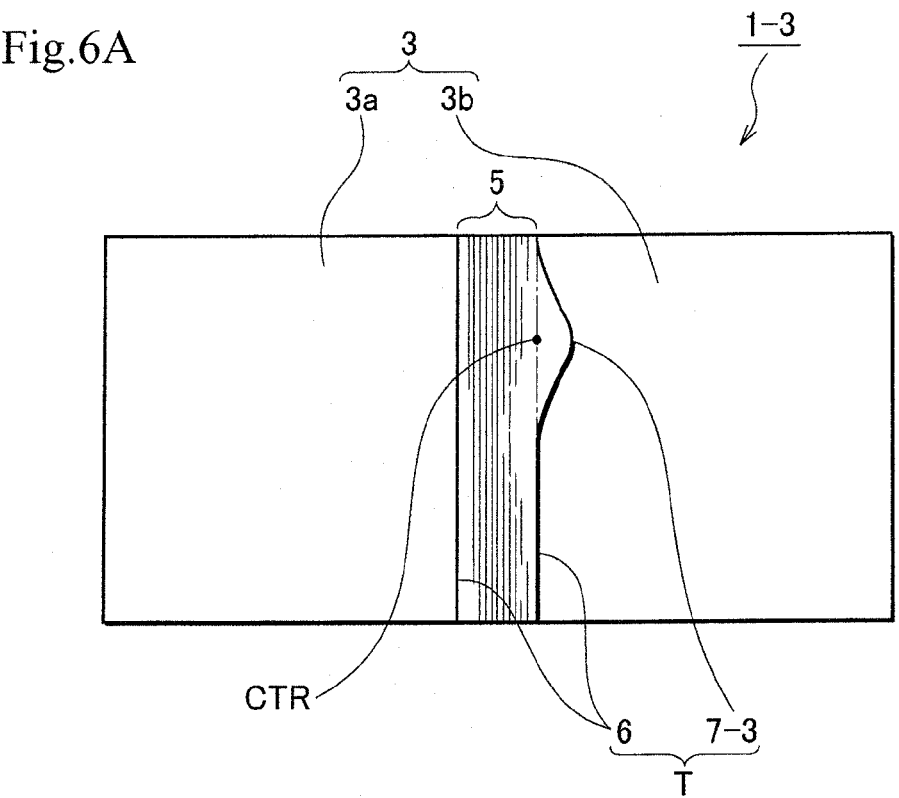
Figure 6B:
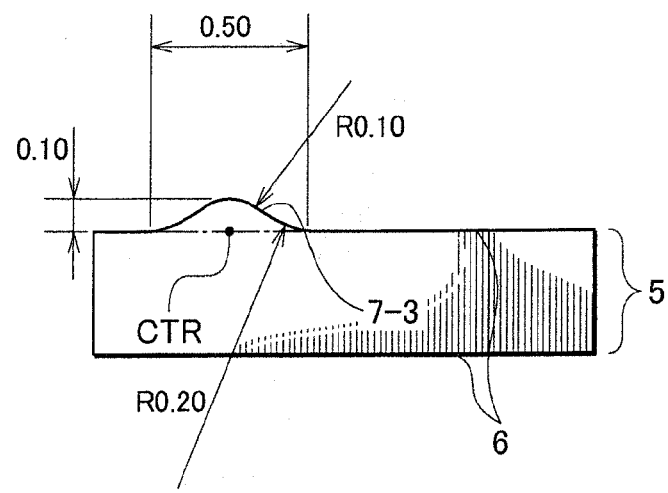

A piezoelectric element according to the third embodiment of the present invention will be explained with reference to FIGS. 6A and 6B in which FIG. 6A is a plan view and FIG. 6B is an essential part of FIG. 6A.

The third embodiment is basically the same as the second embodiment, and therefore, repetition of explanation is omitted and differences between them will mainly be explained.

The third embodiment of FIGS. 6A and 6B employs a polarity recognition mark 7-3 having a pattern T that is smaller than that of the second embodiment and a notch 28-3 whose curvature center CTR is changed from that of the second embodiment.

Namely, the pattern T of the mark 7-3 has a depth of about 0.10 mm, a width of about 0.50 mm, a curvature radius of the notch 28-3 of about 0.10 mm, and a curvature radius of a skirt 30-3 of about 0.20 mm. Compared with the mark 7-2 of the second embodiment, the mark 7-3 of the third embodiment is smaller in the depth, width, and notch curvature radius.

The curvature center CTR of the notch 28-3 of the mark 7-3 is just on a straight line 6 with an offset distance L relative to the straight line 6 being zero.

According to the third embodiment, a boundary 26-3 has the pattern T that is smooth. The notch 28-3 of the mark 7-3 swells from the straight line 6 into an electrode segment 3b and the curvature center CTR of the notch 28-3 is on the straight line 6.

The third embodiment provides the same effect as the second embodiment.

Figure 7A:
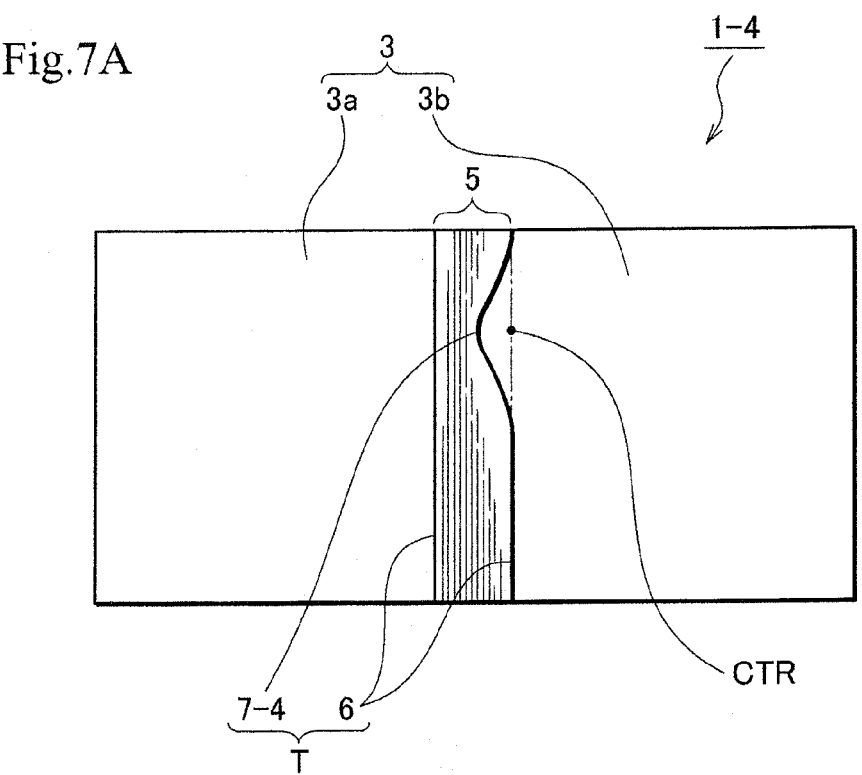
Figure 7B:
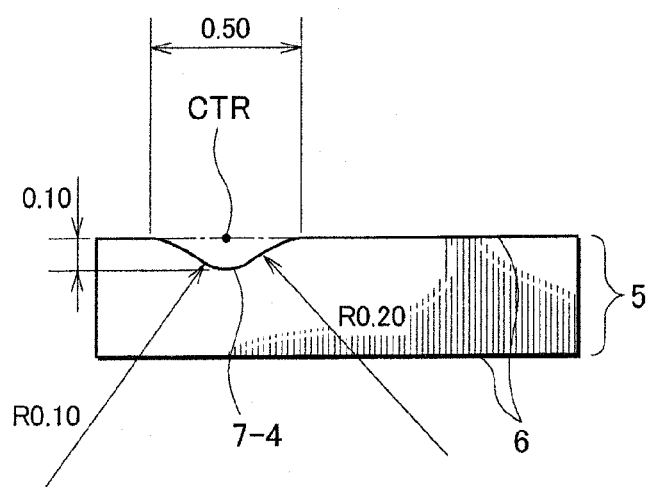

A piezoelectric element according to the fourth embodiment of the present invention will be explained with reference to FIGS. 7A and 7B in which FIG. 7A is a plan view and FIG. 7B is an essential part of FIG. 7A.

The fourth embodiment is basically the same as the third embodiment, and therefore, repetition of explanation is omitted and differences between them will mainly be explained.

The fourth embodiment of FIGS. 7A and 7B employs a polarity recognition mark 7-4 that is oriented oppositely to the third embodiment.

Namely, the mark 7-4 swells from a straight line 6 into a non-electrode part 5. The mark 7-4 has a notch 28-4 whose curvature center CTR is just on the straight line 6 with an offset distance L relative to the straight line 6 being zero.

According to the fourth embodiment, a boundary 26-4 has a pattern T that is smooth. The notch 28-4 of the mark 7-4 swells from the straight line 6 into the non-electrode part 5 and the curvature center CTR of the notch 28-4 is on the straight line 6.

The fourth embodiment provides the same effect as the second embodiment.

Figure 8A:
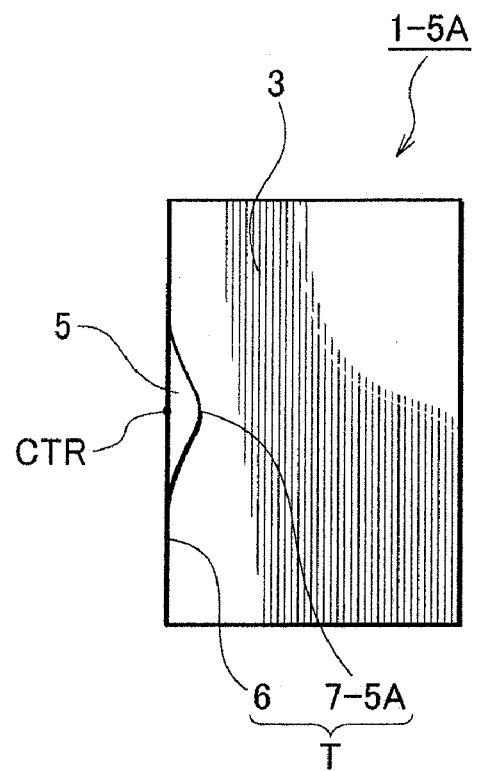
Figure 8B:
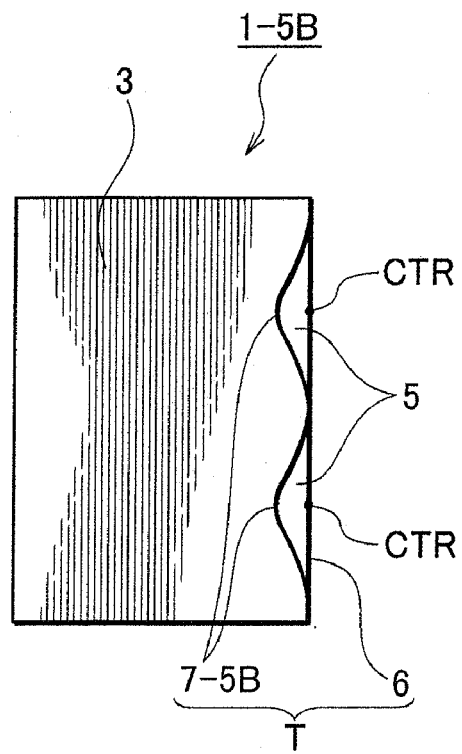

A piezoelectric element according to the fifth embodiment will be explained with reference to FIGS. 8A and 8B in which FIG. 8A is a plan view and FIG. 8B is a modification of the fifth embodiment.

The fifth embodiment is basically the same as the third embodiment, and therefore, repetition of explanation is omitted and differences between them will mainly be explained.

According to the third embodiment, the piezoelectric element 1-3 has the upper electrode 3 that includes the electrode segments 3a and 3b that are separated by the non-electrode part 5 having the swell 22.

On the other hand, the fifth embodiment employs a non-electrode part 32 that is only a swell.

A piezoelectric body 34 according to the fifth embodiment has a rectangular shape whose lengthwise dimension is longer than a widthwise dimension. On a top surface of the piezoelectric body 34, there is an upper electrode 36 whose shape is substantially the same as the top surface of the piezoelectric body 34. Namely, the upper electrode 36 is a single electrode.

A left edge 38 that is one edge in the lateral direction of the upper electrode 36 has a single recess 40 substantially at the center of the edge 38. The recess 40 is recessed into the upper electrode 36 from a main part 48 of the edge 38. The recess 40 defines the non-electrode part 32.

A boundary 46 between the non-electrode part 32 and the upper electrode 36 has a pattern T that is defined by the edge 38 of the upper electrode 36. The pattern T includes a straight line 6 corresponding to the main part 48 of the edge 38 and a polarization recognition mark 7-5A corresponding to the recess 40. The mark 7-5A is substantially the same in shape as the mark 7-3 of the third embodiment.

According to the fifth embodiment, the pattern T of the boundary 46 is smooth. A notch 54 of the mark 7-5A swells from the straight line 6 into the upper electrode 36 and a curvature center CTR of the notch 54 is on the straight line 6.

The fifth embodiment provides the same effect as the above-mentioned embodiments.

The pattern T according to the fifth embodiment is modifiable as illustrated in FIG. 8B.

In FIG. 8B, a right side that is the other edge in the lateral direction of the upper electrode 36 is provided with a boundary 56 having a pattern T. The pattern T includes polarity recognition marks 7-5B that are formed side by side in the longitudinal direction and are spaced from each other by a predetermined distance. Each of the marks 7-5B is a reversal of the mark 7-5A of the fifth embodiment.

This modification provides the same effect as the fifth embodiment.

Occurrence of microcracks in the first to fifth embodiments will be explained with reference to FIG. 9.

FIG. 9 is a table illustrating microcracks observed on the piezoelectric elements of the first to fifth embodiments under different polarization voltages and at different locations.

In FIG. 9, the piezoelectric element 1 of the first embodiment causes no microcracks along the straight line 6 of the pattern T under a normal polarization voltage (for example, 1 kV/mm). It, however, sometimes produces microcracks at the polarization recognition mark 7-1.

The piezoelectric elements 1-2 to 1-5 of the second to fifth embodiments cause no microcracks along the straight lines 6 and marks 7-2 to 7-5 of the patterns T even under a polarization voltage (for example, 1.4 kV/mm) 1.4 times as large as the normal voltage.

In this way, the piezoelectric elements 1-2 to 1-5 according to the second to fifth embodiments are capable of remarkably suppressing the occurrence of microcracks.

A head suspension according to the sixth embodiment of the present invention will be explained with reference to FIG. 10. The head suspension 11 employs the piezoelectric element 1-3 of the third embodiment. The piezoelectric element 1-3 is replaceable with any one of the piezoelectric elements of the first, second, and fourth embodiments.

Figure 10:
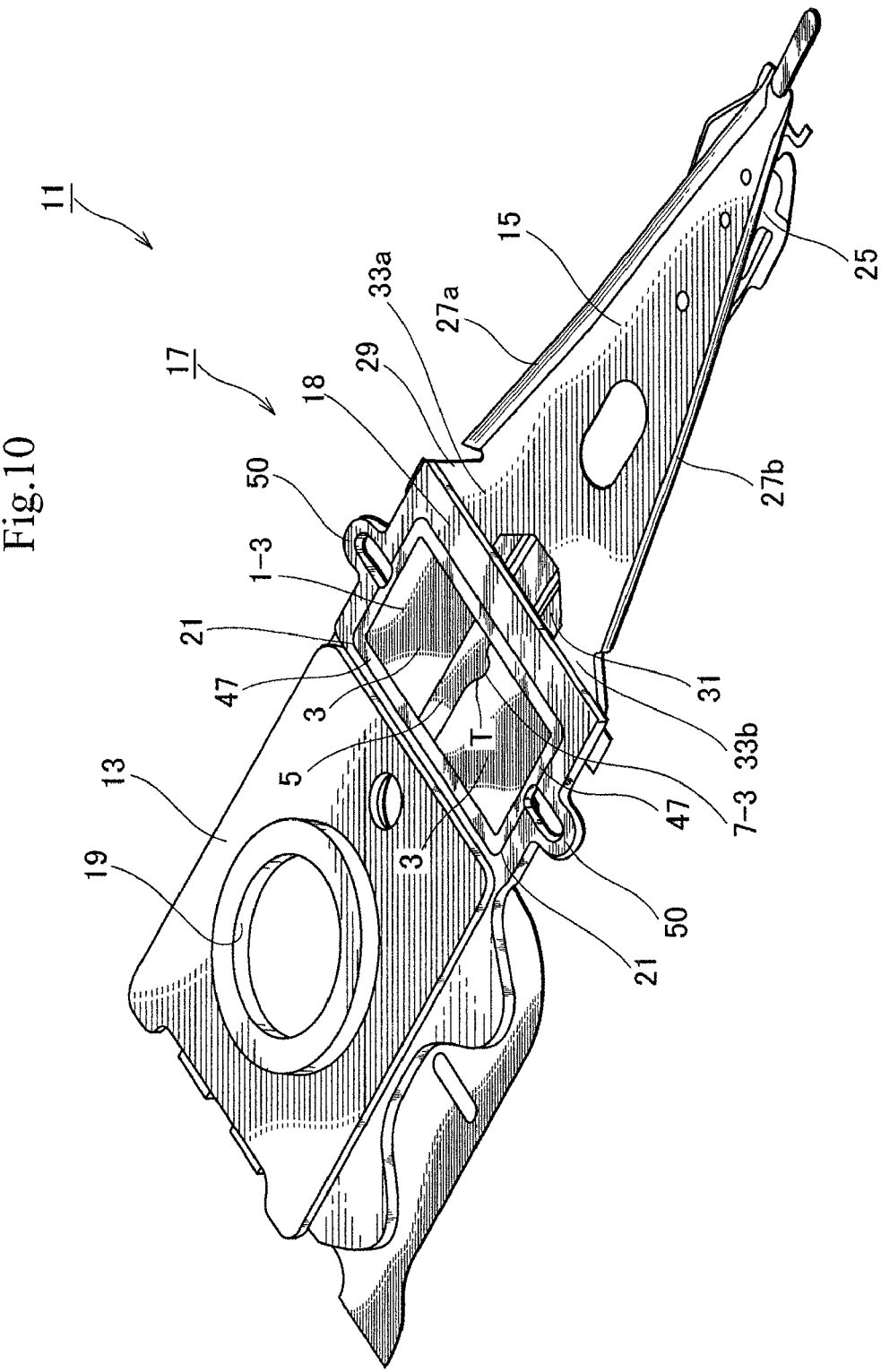
FIG. 10 is a perspective view illustrating a head suspension according to a sixth embodiment of the present invention, the head suspension having the piezoelectric element of the third embodiment.

In FIG. 10, the head suspension 11 has a base plate 13, a load beam 15, and a piezoelectric actuator 17.

The base plate 13 is a metal thin plate made of, for example, stainless steel and has a thickness of about 150 to 200 µm. The base plate 13 may be made of light metal such as aluminum alloy or a clad material including light metal and stainless steel. The light metal reduces the inertia of the base plate 13, increases the resonant frequency of the head suspension 11 in a sway direction, i.e., a lateral direction of the head suspension 11, and improves the tracing performance of the head suspension 11.

The base plate 13 has a circular boss 19. With the boss 19, the base plate 13 is attached to a front end of an actuator arm (not illustrated) and is turned by a voice coil motor (not illustrated). The base plate 13 has a front end in the vicinity of the load beam 15 and a rear end opposite to the front end. The front end of the base plate 13 is connected through the piezoelectric actuator 17 to the load beam 15.

The load beam 15 applies load onto a slider (not illustrated) arranged at a front end of the load beam 15. The load beam 15 is a resilient metal thin plate made of, for example, stainless steel and has a thickness of about 30 to 150 µm. Like the base plate 13, the load beam 15 may be made of light metal such as aluminum alloy or a clad material including light metal and stainless steel.

The load beam 15 has a flexure 25 whose front end supports the slider that has a magnetic head. The load beam 15 has bent edges 27a and 27b extending across the sway direction, to reinforce the stiffness of the load beam 15.

A rear end of the load beam 15 is integral with a connection plate 29. The connection plate 29 is a resilient metal thin plate made of, for example, stainless steel and has a thickness of about 30 µm. The connection plate 29 has a hole 31. The hole 31 reduces the thickness-wise bending stiffness and weight of the connection plate 29. On each side of the hole 31, the connection plate 29 has hinges 33a and 33b that is bendable in a thickness direction. A rear end of the connection plate 29, i.e., a base part of the load beam 15 is attached to a front end of the piezoelectric actuator 17.

Figure 11:
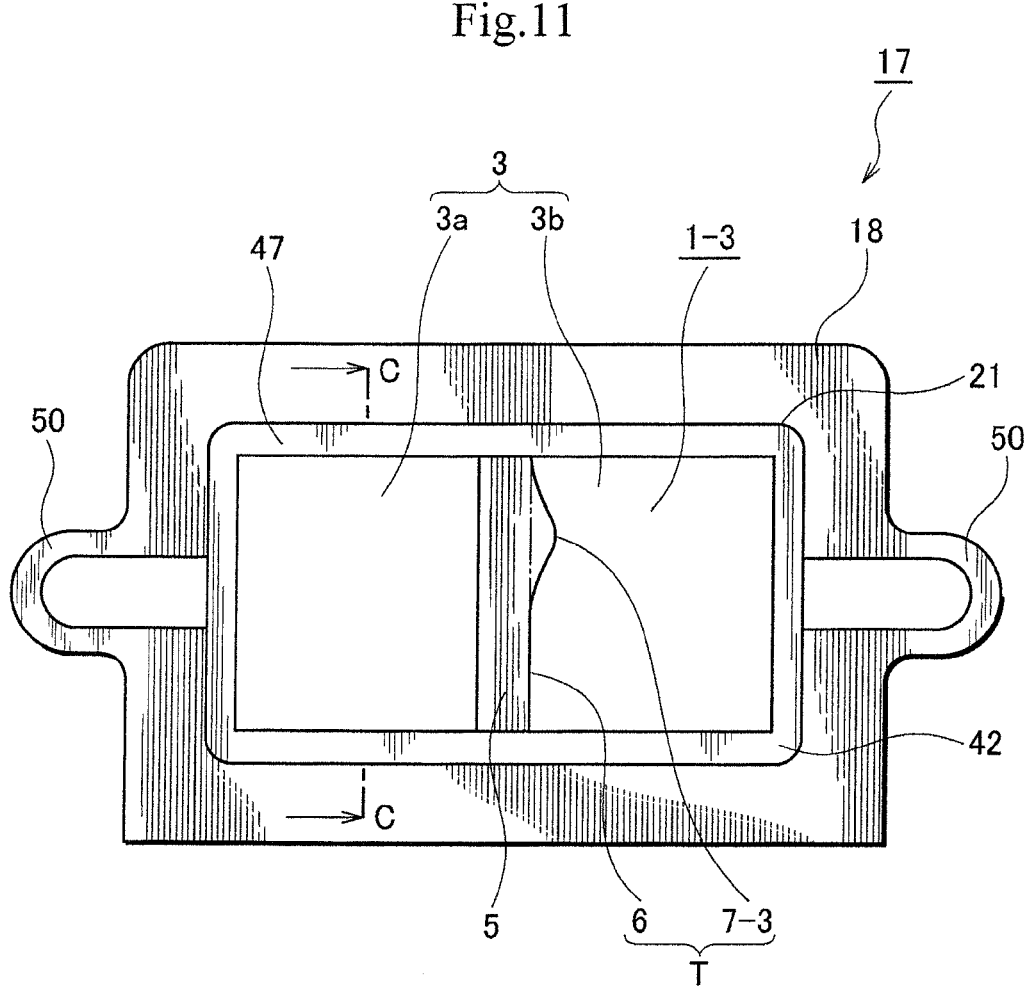
FIG. 11 is a plan view illustrating a piezoelectric actuator installed in the head suspension of the sixth embodiment.
Figure 12:
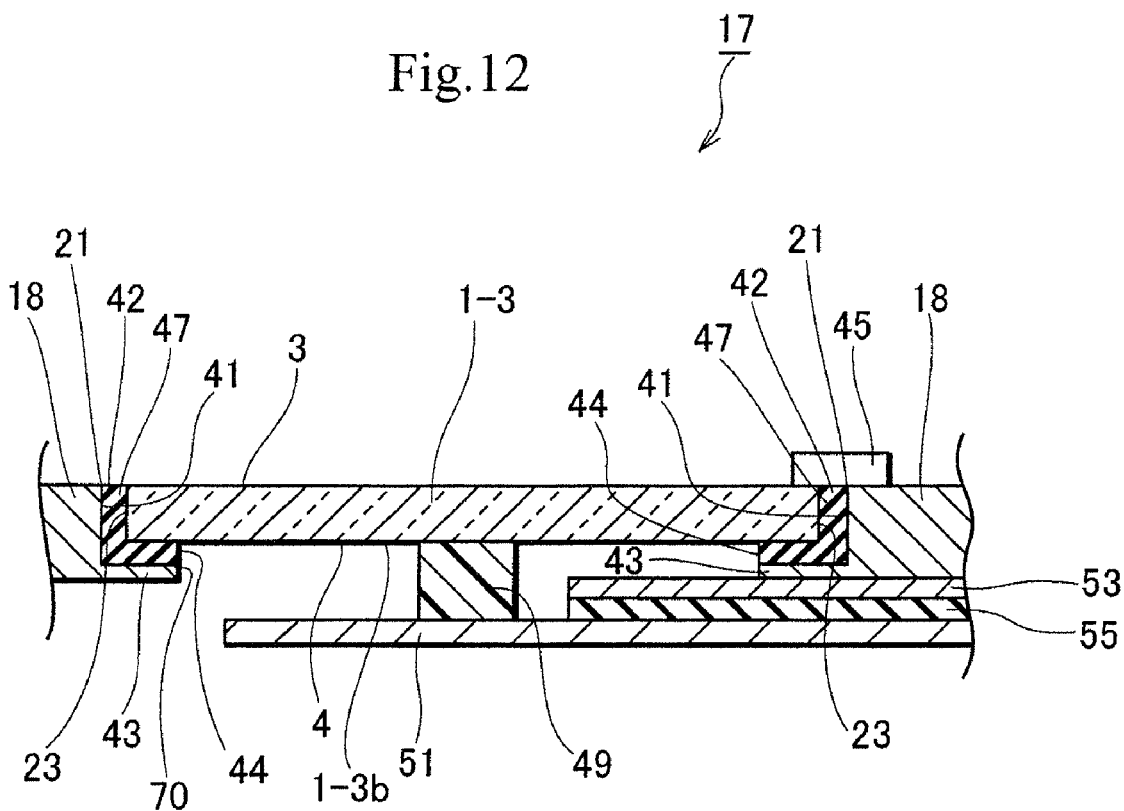
FIG. 12 is a sectional view taken along a line C-C of FIG. 11.

The piezoelectric actuator 17 that is an essential part of the head suspension 11 according to the sixth embodiment will be explained with reference to FIGS. 11 and 12 in which FIG. 11 is a plan view of the piezoelectric actuator 17 and FIG. 12 is a sectional view taken along a line C-C of FIG. 11.

When designing the piezoelectric actuator 17, considerations must be made to effectively transfer a distortion (displacement) of the piezoelectric element 1-3 to the lead beam 15, secure electric insulation between the electrodes 3 and 4 of the piezoelectric element 1-3 and the actuator base 18, prevent dust from dropping off a circumferential side face of the piezoelectric element 1-3, and protect the brittle piezoelectric element 1-3 from being damaged.

In consideration of these points, the piezoelectric actuator 17 of the sixth embodiment is made.

The piezoelectric actuator 17 functions to support the base part of the load beam 15 and move the front end of the load beam 15 in a sway direction (a lateral direction of the load beam 15). The piezoelectric actuator 17 includes the actuator base 18 and piezoelectric element 1-3 as illustrated in FIGS. 10 and 11.

The actuator base 18 is a metal thin plate made of, for example, stainless steel, is interposed between the base plate 13 and the load beam 15, and is separate from the base plate 13 and load beam 15. A front end of the actuator base 18 is in the vicinity of the load beam 15 and a rear end thereof is in the vicinity of the base plate 13.

A bottom face of the front end of the actuator base 18 is laid on the rear end of the connection plate 29, i.e., the base part of the load beam 15 and is fixed thereto by, for example, laser welding. On the rear end of the actuator base 18, the front end of the base plate 13 is laid. The rear end of the actuator base 18 is fixed to the front end of the base plate 13 by, for example, laser welding.

The actuator base 18 may be integral with the base plate 13. In this case, pressing, for example, is employed to punch the integrated base plate 13 and actuator base 18 out of a metal thin plate made of, for example, stainless steel.

The integrated base plate 13 and actuator base 18 is also referred to as "actuator base". Namely, according to the present invention, the "actuator base" can represent both the base plate 13 and actuator base 18.

In FIGS. 10 to 12, the actuator base 18 has an opening 21 to receive the piezoelectric element 1-3. The opening 21 has a rectangular shape elongated in a lateral direction of the head suspension 11 and is defined with a circumferential edge 41 of the actuator base 18.

The opening 21 is provided with a bottom receiver 43 having a flange shape. The bottom receiver 43 is integral with a lower end of the circumferential edge 41 of the opening 21 and inwardly protrudes from the circumferential edge 41. The bottom receiver 43 is formed by partly thinning the actuator base 18 by, for example, half-etching.

The bottom receiver 43 has a communication hole 70 that connects the opening 21 to a bottom face side of the actuator base 18.

In the opening 21, the piezoelectric element 1-3 is embedded. Instead of the piezoelectric element 1-3 of the third embodiment, any one of the piezoelectric elements 1-1, 1-2, and 1-4 of the first, second, and fourth embodiments may be embedded in the opening 21. The piezoelectric element 1-3 deforms in response to a voltage applied to the electrodes 3 and 4, and according to the deformation, the piezoelectric actuator 17 displaces the front end of the load beam 15 in a sway direction.

The piezoelectric element 1-3 has a rectangular shape whose outer dimensions are slightly smaller than inner dimensions of the opening 21. The piezoelectric element 1-3 has a circumferential side face 1-3c that faces the circumferential edge 41 of the opening 21.

The upper electrode 3 of the piezoelectric element 1-3 is substantially flush with a top face of the actuator base 18 and is grounded to the actuator base 18 through conductive resin 45 such as silver paste.

The periphery of the lower electrode 4 of the piezoelectric element 1-3 opposes the bottom receiver 43 of the opening 21 in a thickness direction. An inner side of a bottom face 1-3b of the piezoelectric element 1-3 faces the outside of the bottom face of the actuator base 18 through the communication hole 70 of the bottom receiver 43.

The lower electrode 4 of the piezoelectric element 1-3 is connected through a conductive adhesive 49 to wiring 51 made of, for example, copper formed on the flexure 25. The flexure 25 includes a metal base 53, an electric insulating layer 55 formed on the metal base 53, and the wiring 51 formed on the insulating layer 55. Connection between the lower electrode 4 of the piezoelectric element 1-3 and the wiring 51 of the flexure 25 may be achieved by, instead of the conductive adhesive 49, bonding wire, soldering, or ultrasonic bonding.

When the piezoelectric element 1-3 is set at a predetermined position in the opening 21, the circumferential edge 41 of the opening 21 substantially entirely surrounds the circumferential side face 1-3c of the piezoelectric element 1-3, to form a circumferential gap between them. This gap is a circumferential channel 42 between the circumferential side face 1-3c of the piezoelectric element 1-3 and the circumferential edge 41 of the opening 21. Also, the lower electrode 4 of the piezoelectric element 1-3 forms a predetermined gap 44 with respect to the bottom receiver 43 of the opening 21.

In the circumferential channel 42 and gap 44, a nonconductive adhesive 47 is filled and solidified. The nonconductive adhesive 47 may be any known nonconductive adhesive, or any conductive adhesive containing insulating material such as silica particles or glass particles.

The nonconductive adhesive 47 fills the circumferential channel 42 between the circumferential side face 1-3c of the piezoelectric element 1-3 and the circumferential edge 41 of the opening 21 and joins the piezoelectric element 1-3 and opening 21 together. In addition, the adhesive 47 fills the gap 44 between the lower electrode 4 of the piezoelectric element 1-3 and the bottom receiver 43 of the opening 21 and joins the piezoelectric element 1-3 and opening 21 together. Consequently, the head suspension 11 of the sixth embodiment effectively transfers a distortion (displacement) of the piezoelectric element 1-3 to the load beam 15.

The bottom receiver 43 stops the nonconductive adhesive 47 in the gap 44 so that the adhesive 47 may not leak along the lower electrode 4 of the piezoelectric element 1-3.

When setting the piezoelectric element 1-3 in the opening 21, it is preferable to align a center axis of the actuator base 18 extending in a thickness direction with a center axis of the piezoelectric element 1-3 extending in the thickness direction. This prevents a torsional motion of the piezoelectric actuator 17 during a sway operation.

On each outer side of the opening 21 of the actuator base 18, there is a flexible link 50 having a U-shape outwardly protruding from the opening 21. The flexible links 50 improve stiffness of the piezoelectric actuator 17 without blocking a displacement stroke of the piezoelectric actuator 17 during a sway operation.

Figure 13:
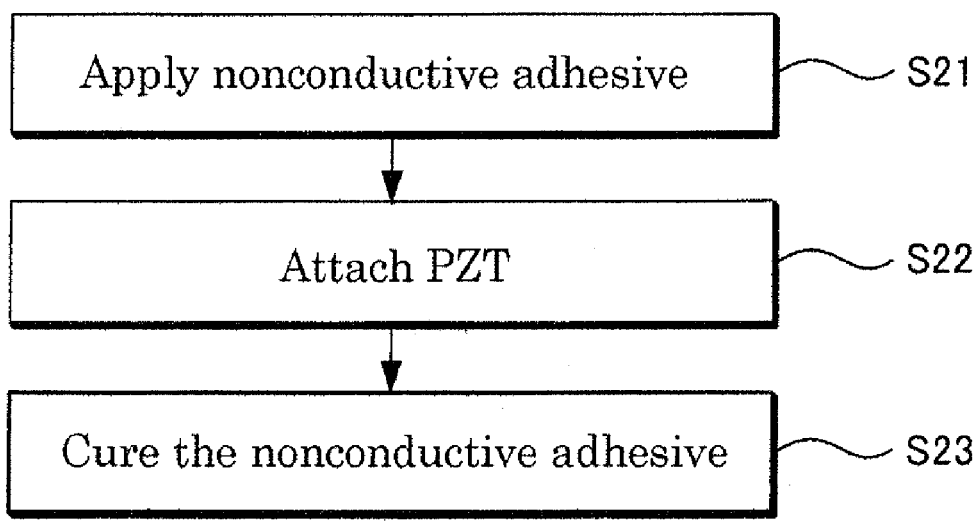
FIG. 13 is a flowchart illustrating attaching a piezoelectric element to an opening of the head suspension of the sixth embodiment.

Attaching the piezoelectric element 1-3 to the opening 21 of the actuator base 18 of the head suspension 11 according to the sixth embodiment will be explained with reference to FIG. 13.

Step S21 applies the nonconductive adhesive 47 into the circumferential channel 42 and gap 44 in the opening 21 of the actuator base 18.

Step S22 places the piezoelectric element 1-3 (indicated as "PZT" in FIG. 13) at a predetermined position in the opening 21.

Step S23 heat-treats the head suspension 11, to cure the nonconductive adhesive 47. The heat treatment is carried out in, for example, an electric furnace at a predetermined temperature for a predetermined time.

The cured nonconductive adhesive 47 fixes the piezoelectric element 1-3 to the opening 21 of the actuator base 18.

Operation of the head suspension 11 will be explained.

The piezoelectric actuator 17 displaces the front end of the load beam 15 in a sway direction according to deformation of the piezoelectric element 1-3 that occurs when a voltage is applied thereto. When applied a voltage, the piezoelectric element 1-3 deforms into a trapezoid with the piezoelectric layer 2a contracting in a longitudinal direction and the piezoelectric layer 2b extending in the longitudinal direction, as illustrated in FIG. 1.

According to the directions and strokes of the extension and contraction of the piezoelectric element 1-3, the piezoelectric actuator 17 deforms to move the front end of the load beam 15 in a sway direction, i.e., a lateral direction of the head suspension 11 for a very small distance.

In the piezoelectric actuator 17, the circumferential side face 1-3c of the piezoelectric element 1-3 is substantially entirely surrounded by the circumferential edge 41 of the opening 21. The gap between the circumferential side face 1-3c and the circumferential edge 41 is filled and fixed with the nonconductive adhesive 47.

With this, the piezoelectric actuator 17 effectively transmits a distortion (displacement) of the piezoelectric element 1-3 through the nonconductive adhesive 47 and actuator base 18 to the load beam 15, thereby smoothly and correctly moving the front end of the load beam 15 in a sway direction.

According to the sixth embodiment, the bottom receiver 43 inwardly protrudes from the circumferential edge 41 of the opening 21 and faces the periphery of the bottom face 1-3b of the piezoelectric element 1-3. The gap between the bottom receiver 43 and the bottom face 1-3b of the piezoelectric element 1-3 is filled with the nonconductive adhesive 47, to surely fix the bottom face 1-3b of the piezoelectric element 1-3 to the bottom receiver 43 and support the piezoelectric element 1-3 from below. This results in smoothly and correctly moving the front end of the load beam 15 in a sway direction.

The polarity recognition mark 7-3 on the piezoelectric element 1-3 helps correctly attaching the piezoelectric element 1-3 to the actuator base 18 of the head suspension 11, so that the piezoelectric actuator 17 may correctly move the front end of the load beam 15 in a sway direction.

The piezoelectric element 1-3 has substantially no microcracks. This improves the productivity of head suspensions and secures the reliability of head suspensions for a long time.

In the head suspension 11 according to the sixth embodiment, the circumferential edge 41 of the opening 21 in the actuator base 18 substantially surrounds the circumferential side face 1-3c of the piezoelectric element 1-3 in such a way as to form the circumferential channel 42 between the circumferential edge 41 and the circumferential side face 1-3c. The circumferential channel 42 is filled with the cured nonconductive adhesive 47.

According to the embodiment, the gap between the circumferential edge 41 of the opening 21 and the circumferential side face 1-3c of the piezoelectric element 1-3 is properly filled with the nonconductive adhesive 47, to attach the piezoelectric element 1-3 to the opening 21 and secure electric insulation between the electrodes 3 and 4 of the piezoelectric element 1-3 and the actuator base 18.

According to the embodiment, the nonconductive adhesive 47 is present substantially entirely along the circumferential channel 42, to effectively transmit a distortion (displacement) of the piezoelectric element 1-3 to the load beam 15, prevent dust from dropping off the circumferential side face 1-3c of the piezoelectric element 1-3, and protect the piezoelectric element 1-3 that is brittle from damage.

According to the embodiment, the opening 21, nonconductive adhesive 47, and piezoelectric element 1-3 join together, so that the joined body functions as an integrated support beam to improve stiffness of the head suspension 11.

According to the embodiment, the flexible links 50 are formed on each side of the opening 21. Each flexible link 50 has a U-shape that protrudes outwardly from the actuator base 18, to improve stiffness of the piezoelectric actuator 17 without preventing a displacement stroke of the piezoelectric actuator 17 during a sway motion.

The head suspension 11 of the sixth embodiment, therefore, secures basic characteristics such as vibration and impact characteristics without deteriorating a displacement stroke of the piezoelectric actuator 17.

Figure 14:
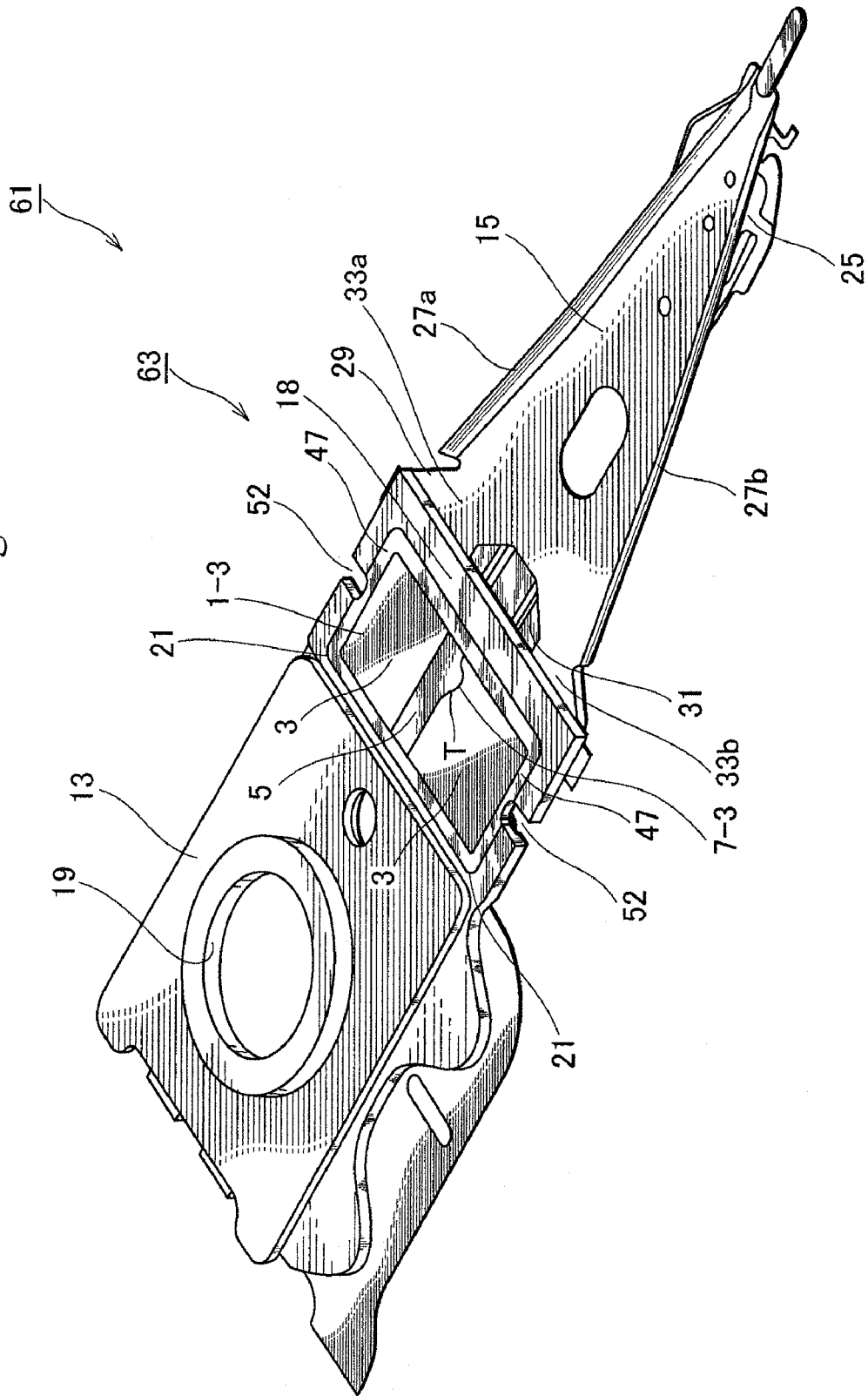
FIG. 14 is a perspective view illustrating a head suspension according to a seventh embodiment of the present invention.

A head suspension according to the seventh embodiment of the present invention will be explained with reference to FIG. 14.

The head suspension 61 according to the seventh embodiment is configured basically the same as the head suspension 11 of the sixth embodiment, and therefore, repetition of explanation is omitted and differences between them will mainly be explained.

The seventh embodiment omits the flexible links 50 of the sixth embodiment. Namely, the head suspension 61 of the seventh embodiment has a piezoelectric actuator 63 having an actuator base 18 in which an opening 21 is formed. On each outer side of the opening 21, a clearance 52 instead of the flexible link 50 of the sixth embodiment is formed.

Each clearance 52 is formed by cutting a wall 62 that forms an outer side of a circumferential edge of the opening 21. Namely, the clearance 52 divides the wall 62 into a front wall 66 and a rear wall 68. By separating the actuator base 18 on each outer side of the opening 21, the clearances 52 allow a load beam 15 of the head suspension 61 to move in sway directions.

The front wall 66 and rear wall 68 are close to each other so that a widthwise dimension of the clearance 52 is larger than a front-rear dimension thereof. With this, a nonconductive adhesive 47 is also present between the clearances 52 and the circumferential side face 1-3c of the piezoelectric element 1-3 embedded in the opening 21.

The nonconductive adhesive 47 fills a circumferential channel 42 including a space between each clearance 52 and the circumferential side face 1-3c of the piezoelectric element 1-3.

The seventh embodiment may employ, instead of the piezoelectric element 1-3 of the third embodiment, any one of the piezoelectric elements 1-1, 1-2, and 1-4 of the first, second, and fourth embodiments.

The clearances 50 formed substantially at a central part on each outer side of the opening 21 do not block a displacement stroke of the piezoelectric actuator 63 in a sway direction and secure high stiffness for the head suspension 61.

Namely, the seventh embodiment provides the same effect as the sixth embodiment without employing the flexible links 50.

Without the outwardly protruding flexible links 50, the seventh embodiment reduces widthwise dimensions of the head suspension 61, increases the number of parts to be taken out of materials, and improves the productivity of head suspensions.

The head suspension 61 according to the seventh embodiment has substantially the same width as standard head suspensions, and therefore, is manufacturable through an existing manufacturing line. This reduces facility investment.

Producing the actuator base 18 according to the seventh embodiment may involve pressing and barreling. In this case, burrs will smoothly be removed from the actuator base 18 because the actuator base 18 has no protruding parts such as the flexible links 50. Namely, the seventh embodiment secures smooth work and reduces manufacturing costs.

When designing a magnetic disk drive in which the head suspension is installed, the head suspension 61 of the seventh embodiment involves no protruding parts such as the flexible links 50, and therefore, there is no need of considering interference of the protruding parts with peripheral parts. This increases the degree of freedom in designing an arrangement of peripheral parts around the head suspension 61 in the magnetic disk drive.

In connection with vibration characteristics, the head suspension 61 according to the seventh embodiment has no protruding parts such as the flexible links 50, and therefore, there is no need of considering vibration modes that never occur on standard head suspensions. Accordingly, the head suspension 61 of the seventh embodiment, which demonstrates the effect of the sixth embodiment as well, can be designed through standard design steps.

Figure 15:
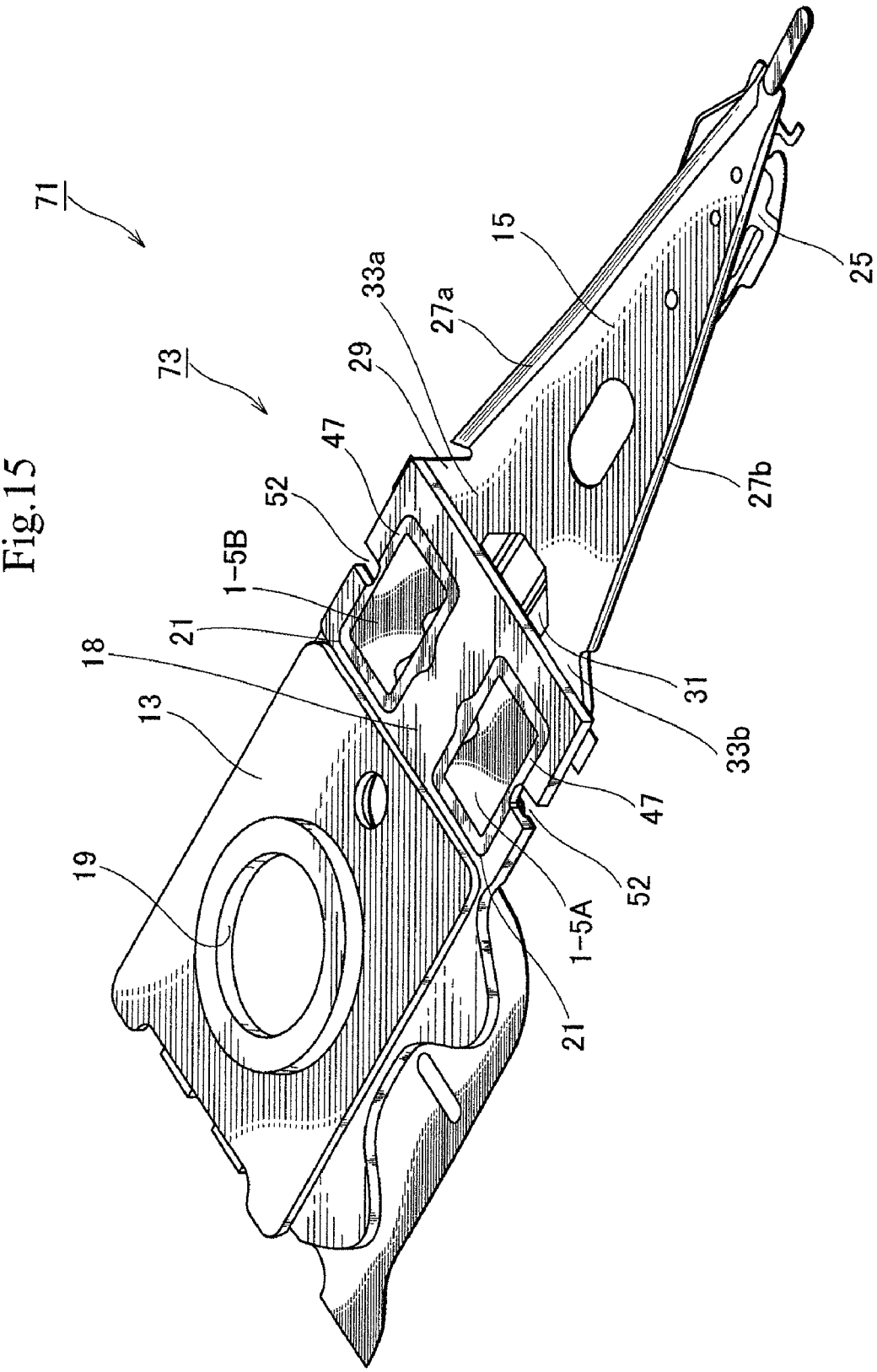
FIG. 15 is a perspective view illustrating a head suspension according to an eighth embodiment of the present invention.

A head suspension according to the eighth embodiment of the present invention will be explained with reference to FIG. 15.

The head suspension 71 according to the eighth embodiment is configured basically the same as the head suspension 61 of the seventh embodiment, and therefore, repetition of explanation is omitted and differences between them will mainly be explained.

The seventh embodiment employs the single opening 21 in which the single piezoelectric element 1-3 is embedded. On the other hand, the eighth embodiment employs a pair of openings 21 in which a pair of piezoelectric elements 1-5A and 1-5B (FIG. 8) are embedded, respectively.

The piezoelectric elements 1-5A and 1-5B are those of the fifth embodiment and the modification thereof. Each of the piezoelectric elements 1-5A and 1-5B is polarized only in one direction. The eighth embodiment employs a combination of the piezoelectric elements 1-5A and 1-5B.

The eighth embodiment provides the same effect as the seventh embodiment.

The present invention is not limited to the embodiments mentioned above and is modifiable according to the descriptions of the claims and specification without departing from the scope thereof. Piezoelectric elements and head suspensions based on such modifications also fall in the scope of the present invention.

Although the first to fourth embodiments form the polarity recognition marks 7-1 to 7-4 on the boundaries 26 to 26-4 on one side of the non-electrode part 5, the mark may be formed on the other side or both the sides of the non-electrode part 5.

The above-mentioned embodiments are based on an assumption that a head suspension is arranged above a magnetic disk in a magnetic disk drive so as to face the magnetic disk. In practice, a head suspension is also arranged below the magnetic disk so as to face the same. The present invention is applicable to each case by properly interpreting positional expressions in the explanation of the embodiments depending on the case.

What is claimed is:

1. A piezoelectric element with electrode comprising:
a piezoelectric body configured to deform according to polarity in response to a voltage applied thereto;
first and second electrodes formed on opposite surfaces of the piezoelectric body in a thickness direction, respectively;
a non-electrode part formed on at least one of the surfaces of the piezoelectric body adjoining one of the first and second electrodes that is on said at least one of the surfaces of the piezoelectric body in a same plane;

a boundary defined between the non-electrode part and said one of the electrodes along the non-electrode part; and the boundary having an individualistic pattern according to at least a polarization direction of the piezoelectric body so that the individualistic pattern indicates at least the polarity of the piezoelectric element.

2. The piezoelectric element of claim 1, wherein the non-electrode part is a recess to separate said one of the electrodes into electrode segments.

3. The piezoelectric element of claim 1, wherein the non-electrode part is at an intermediate part of said one of the electrodes to separate said one of the electrodes into a pair of symmetrical electrode segments.

4. The piezoelectric element of claim 1, wherein the non-electrode part is on an outer circumferential edge of said one of the electrodes.

5. The piezoelectric element of claim 1, wherein the pattern of the boundary includes a continuation of curves each having a small curvature to avoid a local stress concentration on the piezoelectric body.

6. The piezoelectric element of claim 1, wherein the pattern of the boundary includes a straight line and a curve that swells from the straight line and serves as a polarity recognition mark.

7. The piezoelectric element of claim 6, wherein the polarity recognition mark has a curvature center that is positioned on one of a spot on the straight line and a spot shifted from the straight line in a direction opposite to the swelling direction.

8. The piezoelectric element of claim 6, wherein the polarity recognition mark employs one or a combination of the position, quantity, curvature radius, and swelling direction thereof, to indicate information about the piezoelectric element.

9. A head suspension having the piezoelectric element of claim 1, comprising:
   a load beam;
   an actuator base connected to a base part of the load beam and having an opening;
   the piezoelectric element being attached to the opening of the actuator base, to constitute a piezoelectric actuator; and
   the piezoelectric actuator being configured to move a front end of the load beam in a sway direction.

10. The head suspension of claim 9, further comprising:
    a circumferential channel formed between the piezoelectric element and the opening of the actuator base; and
    a nonconductive adhesive filled in the circumferential groove, to join the piezoelectric element and the opening together.

11. The head suspension of claim 10, further comprising:
    a pair of flexible links formed on the actuator base on each side of the opening, each flexible link having a U-shape protruding outwardly from the opening.

12. The head suspension of claim 11, wherein the actuator base has two openings formed side by side in a lateral direction of the load beam, and
    the piezoelectric element is attached to each of the openings.

13. The head suspension of claim 9, further comprising:
    a pair of clearances each formed across the actuator base on an outer side of the opening.

14. The head suspension of claim 13, wherein the actuator base has two openings formed side by side in a lateral direction of the load beam, and
    the piezoelectric element is attached to each of the openings.

15. A piezoelectric element with electrode comprising:
    a piezoelectric body configured to deform according to polarity in response to a voltage applied thereto;
    a first electrode having a first segment and a second segment formed on a first surface of the piezoelectric body;
    a common electrode formed on a second surface of the piezoelectric body opposite the first surface;
    a non-electrode area occurring on the first surface separating the first segment and second segment of the first electrode;
    a first boundary occurring at an edge of the first segment bordering the non-electrode area; and
    a second boundary occurring at an edge of the second segment bordering the non-electrode area; and
    wherein at least one of the first boundary and the second boundary has a varying contour in which variation of the varying contour is indicative of a piezoelectric characteristic of the piezoelectric element.

16. The piezoelectric element of claim 15, wherein the varying contour forms a polarity recognition mark employing one or a combination of position, quantity, curvature radius, and swelling direction thereof along the varying contour to indicate information about the piezoelectric element.

17. The piezoelectric element of claim 15, wherein the contour of the first boundary differs from the contour of the second boundary.

18. The piezoelectric element of claim 15, wherein the varying contour has a first contour profile for a piezoelectric element having a first polarity and has a second contour profile, different than the first contour profile, for a piezoelectric element having a second polarity different than the first polarity.

* * * * *